(12) United States Patent
Koonankeil

(10) Patent No.: US 11,320,334 B2
(45) Date of Patent: May 3, 2022

(54) METHOD AND ASSEMBLY FOR INSPECTING ENGINE COMPONENT

(71) Applicant: RAYTHEON TECHNOLOGIES CORPORATION, Farmington, CT (US)

(72) Inventor: James M. Koonankeil, Malborough, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/125,138

(22) Filed: Dec. 17, 2020

(65) Prior Publication Data

US 2021/0102859 A1    Apr. 8, 2021

Related U.S. Application Data

(63) Continuation of application No. 15/030,236, filed as application No. PCT/US2014/061064 on Oct. 17, 2014, now abandoned.

(60) Provisional application No. 61/892,541, filed on Oct. 18, 2013.

(51) Int. Cl.
| | |
|---|---|
| *G01M 3/02* | (2006.01) |
| *F01D 5/18* | (2006.01) |
| *G01N 21/88* | (2006.01) |
| *G01N 21/954* | (2006.01) |
| *G01N 21/956* | (2006.01) |
| *F01D 21/00* | (2006.01) |
| *G01K 13/02* | (2021.01) |
| *G01M 15/14* | (2006.01) |

(52) U.S. Cl.
CPC ............ *G01M 3/025* (2013.01); *F01D 5/186* (2013.01); *F01D 21/003* (2013.01); *G01K 13/02* (2013.01); *G01M 15/14* (2013.01); *G01N 21/8806* (2013.01); *G01N 21/954* (2013.01); *G01N 21/95692* (2013.01); *F05D 2260/80* (2013.01); *F05D 2270/8041* (2013.01)

(58) Field of Classification Search
CPC combination set(s) only.
See application file for complete search history.

(56) References Cited

U.S. PATENT DOCUMENTS

| | | | |
|---|---|---|---|
| 4,908,782 | A | 3/1990 | Pekarek et al. |
| 6,153,889 | A | 11/2000 | Jones |
| 6,380,512 | B1 | 4/2002 | Emer |
| 6,877,894 | B2 | 4/2005 | Vona et al. |
| 7,075,083 | B2 | 7/2006 | Beyer |

(Continued)

FOREIGN PATENT DOCUMENTS

EP    2339333 A1    6/2011

OTHER PUBLICATIONS

International Search Report and Written Opinion for International Application No. PCT/US2014/061064, dated Jan. 27, 2015.

*Primary Examiner* — Jennifer Bahls
(74) *Attorney, Agent, or Firm* — Carlson, Gaskey & Olds, P.C.

(57) ABSTRACT

One exemplary embodiment of this disclosure relates to a method of inspecting a component of a gas turbine engine. The method includes performing a through-hole inspection, and determining a location of the plurality of holes from results of the through-hole inspection.

17 Claims, 3 Drawing Sheets

(56) References Cited

U.S. PATENT DOCUMENTS

| | | |
|---|---|---|
| 7,574,035 B2 | 8/2009 | Koonankeil |
| 7,671,338 B2 | 3/2010 | Key |
| 8,244,488 B2 | 8/2012 | Allen et al. |
| 8,768,646 B2 | 7/2014 | Key |
| 2004/0101023 A1 | 5/2004 | Choi |
| 2004/0263837 A1* | 12/2004 | Kimberlin ............ G01N 21/894 356/237.6 |
| 2005/0217131 A1 | 10/2005 | Varsell et al. |
| 2007/0290134 A1 | 12/2007 | Key et al. |
| 2010/0224772 A1 | 9/2010 | Lemieux et al. |
| 2011/0119020 A1 | 5/2011 | Key |
| 2011/0235672 A1 | 9/2011 | Shepard et al. |
| 2011/0267451 A1 | 11/2011 | Drescher et al. |
| 2012/0154570 A1 | 6/2012 | Bunker et al. |
| 2012/0188380 A1 | 7/2012 | Drescher et al. |
| 2012/0256920 A1 | 10/2012 | Marshall et al. |
| 2013/0163849 A1 | 6/2013 | Jahnke et al. |
| 2015/0122998 A1* | 5/2015 | Koonankeil ............ F01D 5/288 250/338.3 |
| 2016/0003607 A1* | 1/2016 | Reed ...................... G01B 11/24 73/865.8 |

* cited by examiner

METHOD AND ASSEMBLY FOR INSPECTING ENGINE COMPONENT

RELATED APPLICATIONS

This application is a continuation of prior U.S. application Ser. No. 15/030,236, filed Apr. 18, 2016, which is a national stage entry of International Application No. PCT/US2014/061064, filed Oct. 17, 2014, which claims the benefit of U.S. Provisional Application 61/892,541, filed Oct. 18, 2013. The aforementioned applications are herein incorporated by reference in their entirety.

BACKGROUND

Gas turbine engine components, such as rotor blades and stator vanes, include core cooling passageways configured to communicate fluid within the component. These core passageways are in communication with cooling holes, which direct fluid toward an outer surface of the component. Components are often inspected to determine whether the cooling holes have been properly machined.

In one known inspection method, a component is placed in a first assembly where the component is visually inspected (e.g., using a camera) to determine the location of the cooling holes relative to an acceptable location for those holes. In a separate assembly, the component undergoes a through-hole (or thru-hole) inspection to determine whether the cooling holes are blocked.

SUMMARY

An inspection assembly according to an exemplary aspect of this disclosure includes, among other things, a controller configured identify a set of pixels adjacent an acceptable hole location along an airfoil section of an engine component. Further, the controller is configured to identify a misaligned hole when a centroid of the set of pixels is outside the acceptable hole location.

In a further embodiment of the foregoing inspection assembly, a thermal imaging camera configured to capture the set of pixels, a fixture for supporting the engine component, and a fluid source in communication with a core passageway of the engine component.

In a further embodiment of any of the foregoing inspection assemblies, the core passageway is in fluid communication with a plurality of cooling holes on an outer surface of the airfoil section.

In a further embodiment of any of the foregoing inspection assemblies, the assembly includes a conduit connecting the fluid source to the core passageway.

In a further embodiment of any of the foregoing inspection assemblies, the controller is configured to identify partially blocked holes by determining a number of pixels within the set of pixels that are inside the acceptable hole location and determining that the number is greater than zero but below a minimum threshold.

In a further embodiment of any of the foregoing inspection assemblies, the controller is in communication with a model including the acceptable hole locations.

In a further embodiment of any of the foregoing inspection assemblies, at least some pixels within the set of pixels are inside the acceptable hole location.

A method according to an exemplary aspect of the present disclosure includes, among other things, performing a through-hole inspection on a component of a gas turbine engine, wherein the results of the through-hole inspection include a plurality pixels, identifying a set of pixels adjacent an acceptable hole location along an airfoil section of the component, determining a location of the set of pixels by identifying a centroid of the set of pixels, and identifying a misaligned hole when the centroid is outside the acceptable hole location.

In a further embodiment of the foregoing method, the method includes identifying a partially blocked hole by determining a number of pixels within the set of pixels that are inside the acceptable hole location and determining that the number is greater than zero but below a minimum threshold.

In a further embodiment of any of the foregoing methods, the through-hole inspection includes a flow thermography process.

In a further embodiment of any of the foregoing methods, the flow thermography process includes providing a flow of fluid within the component and taking a thermal image as the fluid exits the holes formed in the airfoil section of the component.

In a further embodiment of any of the foregoing methods, taking the thermal image includes taking a thermal video of the fluid exiting the holes.

In a further embodiment of any of the foregoing methods, the method includes expressing the locations of holes in the airfoil section of the component relative to secondary datums.

In a further embodiment of any of the foregoing methods, the method includes translating the locations of holes to being expressed in terms of primary datums.

In a further embodiment of any of the foregoing methods, the component is an airfoil including the airfoil section and a root, the secondary datums are located on the root, and the primary datums are located on the airfoil section.

In a further embodiment of any of the foregoing methods, the method includes forming a plurality of cooling holes in the airfoil section before the through-hole inspection is performed, and, if a misaligned hole is identified, further manufacturing the airfoil section to correct the misaligned hole.

In a further embodiment of any of the foregoing methods, the through-hole inspection generates a plurality of sets of pixels, each of the sets of pixels is adjacent a respective acceptable hole location along the airfoil section, locations of each of the sets of pixels are determined by identifying a centroid of the respective set of pixels, and misaligned holes are identified when one of the centroids is outside a respective one of the acceptable hole locations.

In a further embodiment of any of the foregoing methods, the pixels are of a color corresponding to a temperature of a fluid used in the through-hole inspection.

In a further embodiment of any of the foregoing methods, the acceptable hole location is predefined in engineering specifications.

In a further embodiment of any of the foregoing methods, at least some pixels within the set of pixels are inside the acceptable hole location.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
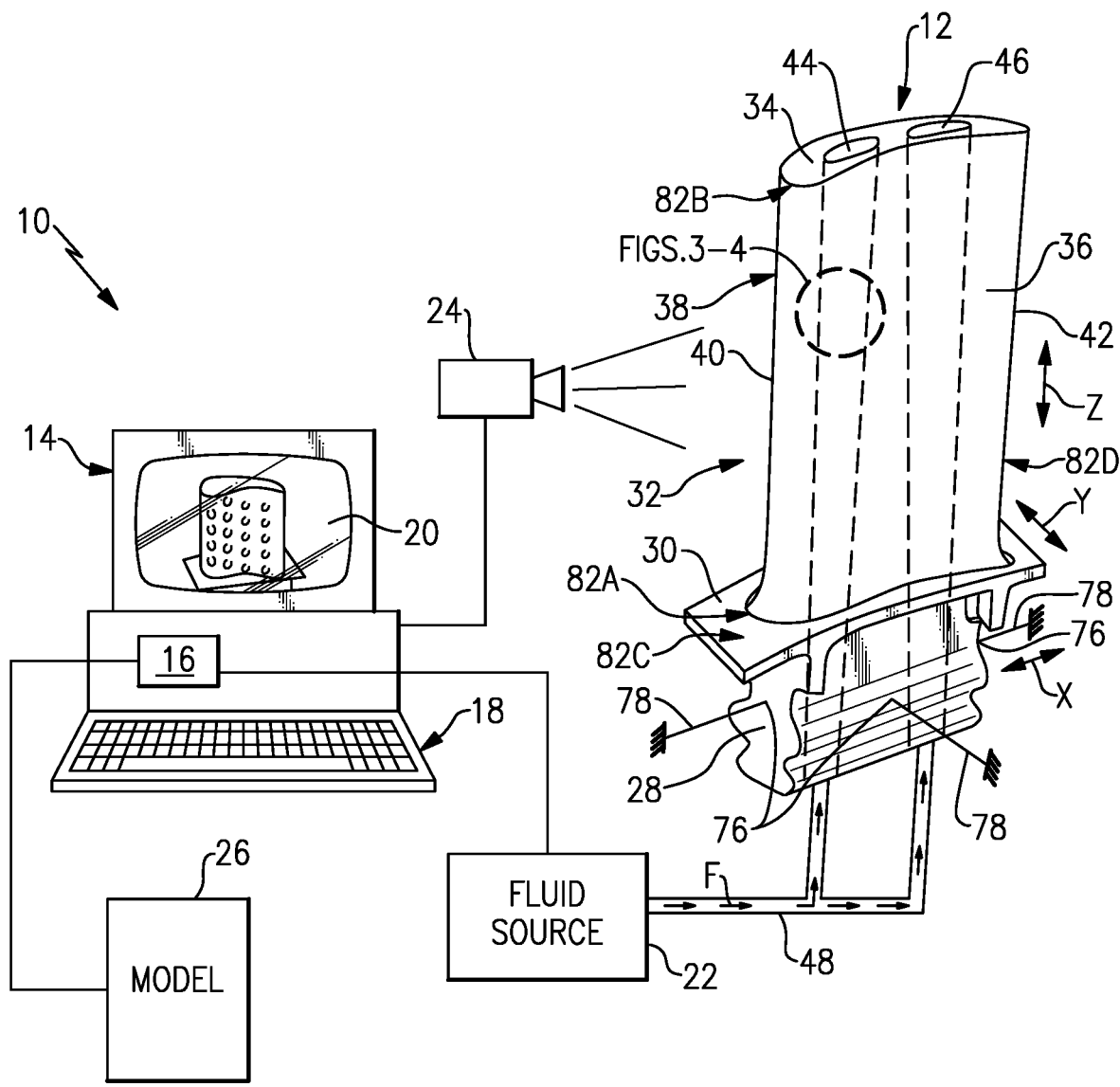
FIG. 1 schematically illustrates an example inspection assembly according to this disclosure.

FIG. 1 schematically illustrates an example inspection assembly 10 for inspecting an engine component 12. It should be understood that this disclosure is not limited to the details of the illustrated inspection assembly 10, and otherwise extends to other inspection assemblies. Further, while the engine component 12 illustrated herein as a turbine blade, it should be understood that this disclosure extends to other engine components, such as stator vanes, blade outer air seals (BOAS), combustor liners, and augmentor liners, as examples.

The inspection assembly 10 includes a computer 14 in communication with a controller 16 capable of receiving inputs, such as from the keyboard 18, and displaying an output in one example via a display, or monitor, 20. In one example, the controller 16 includes a microprocessor capable of executing instructions in accordance with the functionality described herein.

In this example, the controller 16 is in communication with a fluid source 22, which is in fluid communication with the engine component 12, as will be discussed below. The controller 16 is further in communication with a camera 24. In one example, the camera 24 is a thermal infrared (IR) camera used to determine the temperature of an object by detecting radiation and producing a still image, or alternatively a video, of that radiation. In this sense, the assembly 10 provides a flow thermography system. The controller 16 is further in communication with a model 26, which may include information such as an acceptable cooling hole location, a minimum pixel threshold for determining an acceptable hole size, etc., as will be appreciated from the below.

In the example where the engine component 12 is a rotor blade, the engine component 12 includes a root 28, a platform 30, and an airfoil section 32. The airfoil section 32 extends radially (e.g., in the radial direction Z) from the platform 30 to a blade tip 34. The airfoil section 32 includes a pressure side wall 36 and a suction side wall 38, each of which extend between a leading edge 40, and a trailing edge 42 of the airfoil section 32.

Figure 3:
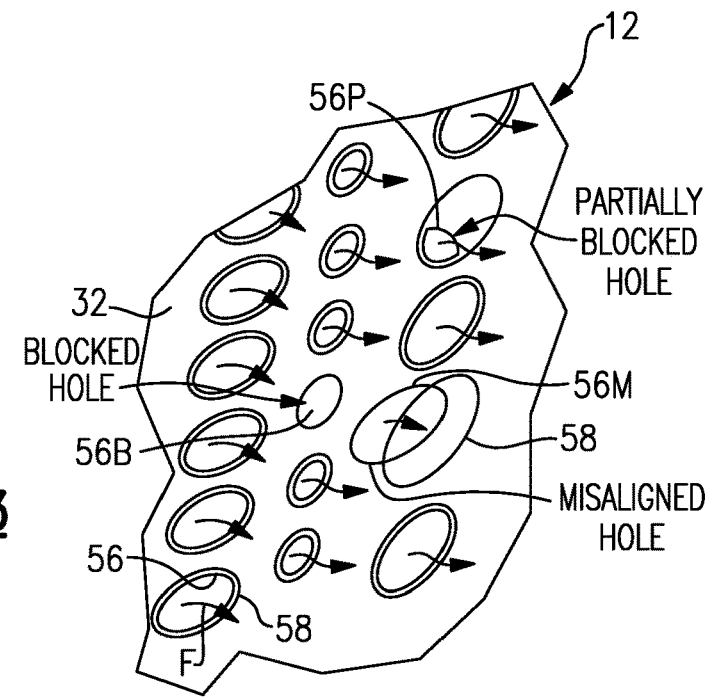
FIG. 3 illustrates a portion of the component of FIG. 1.

A plurality of core cooling passageways 44, 46 extend radially from the root 28 to the blade tip 34. Here, two core cooling passageways 44, 46 are illustrated. As is known in the art, these core cooling passageways 44, 46 may be in communication with a plurality of cooling holes leading from the core cooling passageways 44, 46 to an outer surface of the airfoil section 32. A plurality of cooling holes are illustrated in FIG. 3, which will be discussed in detail below. While core cooling passageways 44, 46 are illustrated, this disclosure extends to platform cooling holes that may not be in communication with a core cooling passageway.

The fluid source 22 is in communication with each of the core passageways 44, 46 by way of a conduit 48. Upon instruction from the controller 16, fluid F from the fluid source 22 is configured to be directed along the core passageways 44, 46. As the fluid F flows along the core passageways 44, 46, a portion of that fluid F is directed out the plurality of cooling holes and flows adjacent the outer surface of the airfoil section 32.

The camera 24 is configured to generate an image of the fluid F as it exits these cooling passageways. This image may then be used to conduct a through-hole inspection, which in turn may be used to determine the location of the cooling holes.

Figure 2:
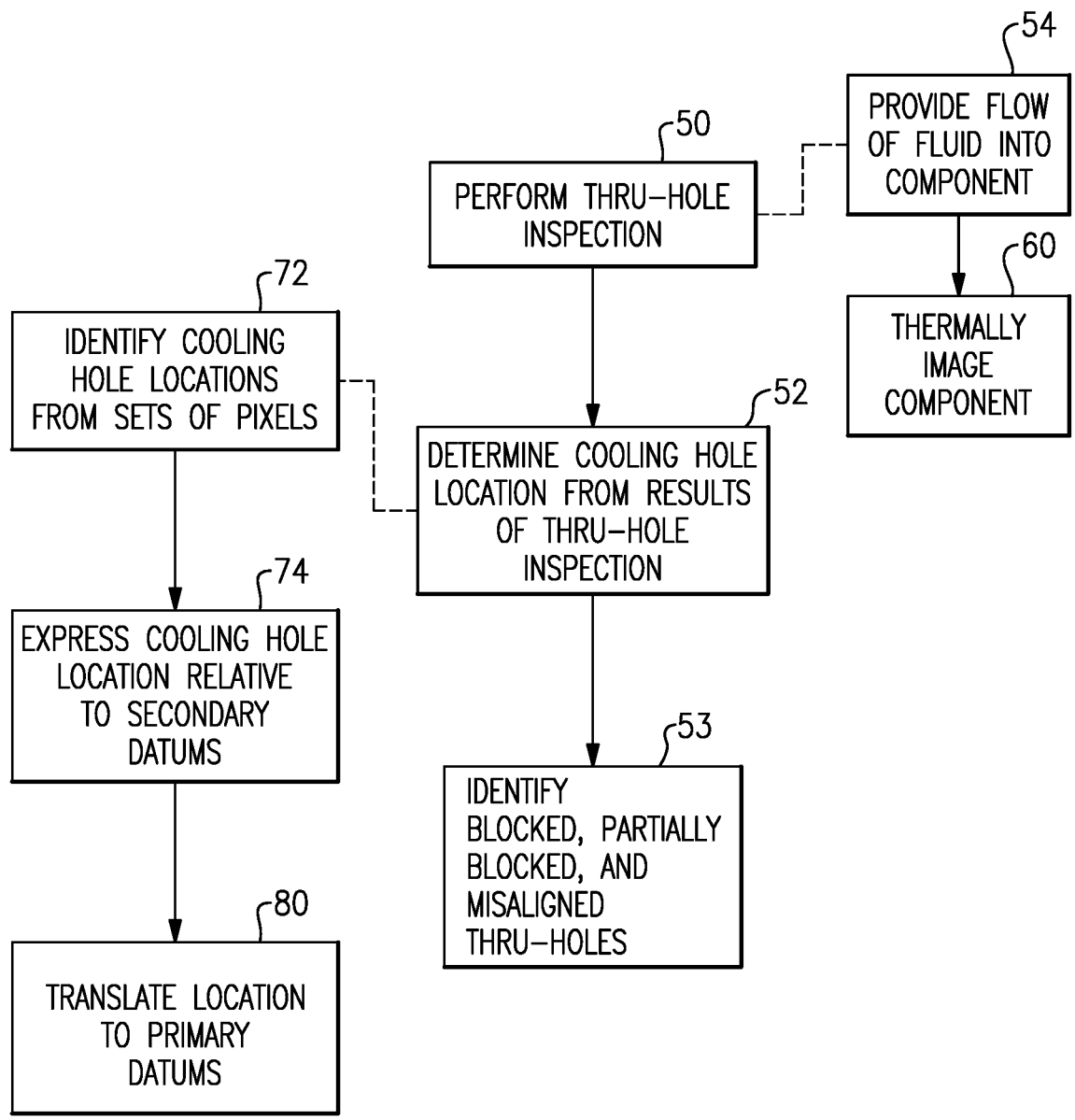
FIG. 2 is a flow chart illustrating an example method according to this disclosure.

A flow chart illustrating an example method according to this disclosure is provided in FIG. 2. The method according to this disclosure includes performing a through-hole inspection 50, determining a location of the plurality of holes machined in the component 12 based on the results from the through-hole inspection, at 52, and identifying blocked, partially blocked, and misaligned cooling holes, at 53.

In one example of this disclosure, a through-hole inspection, at 50, is performed using a flow thermography process. In this process, a flow of fluid F is introduced into the component 12, at 54. FIG. 3 illustrates a portion of the airfoil section 32 of the component 12. The airfoil section 32, as mentioned above, has been machined to include a plurality of cooling holes 56.

The cooling holes 56 are intended to communicate fluid F from one of the core passageways 44, 46 to an outer surface of the airfoil section 32. Acceptable cooling hole locations 58 are illustrated herein for purposes of explanation. The acceptable locations 58 may be provided from engineering specifications and stored in the model 26.

In some instances, the cooling holes 56 are not machined within the acceptable location 58, resulting in a misaligned hole, illustrated at 56M, wherein the misaligned hole 56M falls outside the acceptable hole location 58.

In other instances, the hole may be blocked, or not drilled at all, as illustrated at 56B. Blocked holes 56B do not communicate any fluid F from the core passageways 44, 46 to the outer surface of the airfoil section 32. Further, a hole may be partially blocked, as illustrated at 56P, in which case the flow of fluid F communicated between the core passageways 44, 46 and the outer surface of the airfoil section 32 is insufficient.

Figure 4:
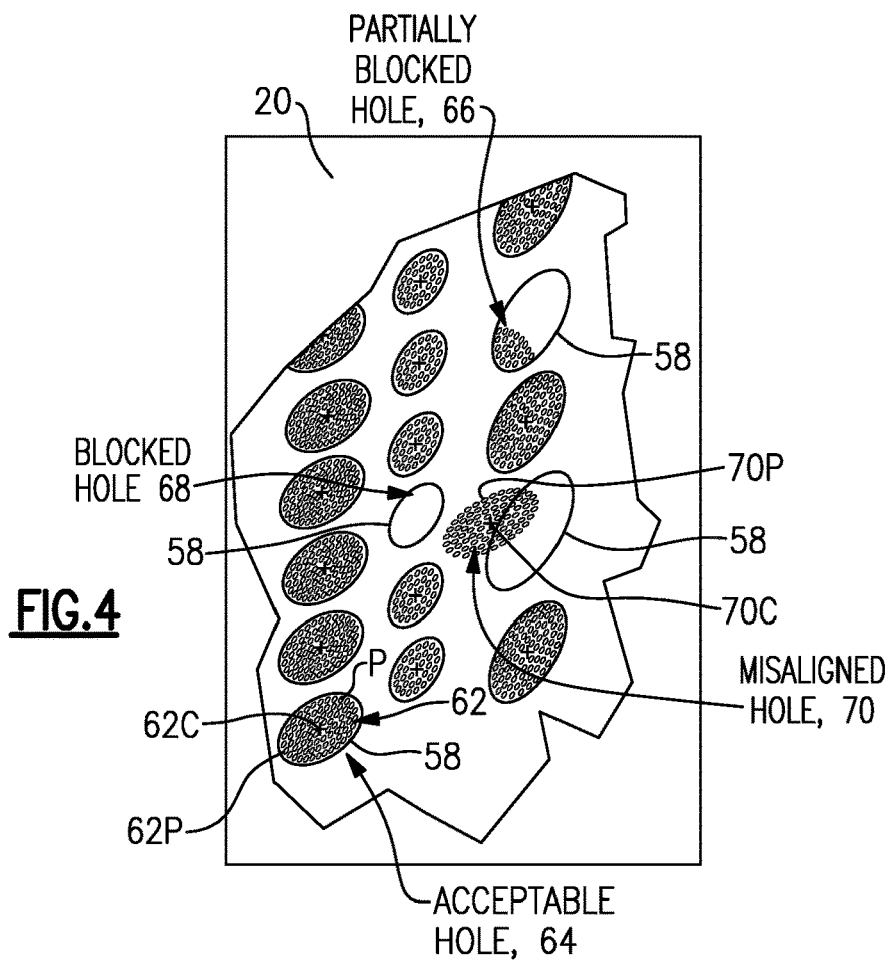
FIG. 4 illustrates an example inspection result, relative to the portion of the component illustrated in FIG. 3.

As fluid F flows through the holes 56, the camera 24 provides a thermal image of the cooling holes 56, at 60. FIG. 4 illustrates an example thermal image of the cooling holes of FIG. 3. The image, which may be displayed on the screen 20, is a plurality of sets 62 of pixels P. In one example, the pixels P are of a particular color that corresponds to the known temperature of the fluid F.

In the bottom left-hand corner of FIG. 4, a first set of pixels P indicates that the cooling hole 64 is acceptable. In this example, the pixel count within the acceptable hole location 58 is greater than or equal to a minimum threshold. The minimum threshold is a predetermined value known to correspond to a cooling hole that provides adequate cooling. The minimum threshold may be stored in the model 26. When the pixel count is below the minimum threshold, a partially blocked hole, such as the partially blocked hole 66, will be identified, at 53. Where no pixels are shown within an expected location 58, a blocked hole, such as the blocked hole 68, will be identified (again, at 53).

From the results of the through-hole inspection (e.g., the image illustrated in FIG. 4), the location of the cooling holes 56 can be determined, at 52. In one example, the location of the cooling holes 56 is determined first by analyzing the sets of pixels 62 from the results of the through-hole inspection, at 72. In a first example, the centroid 62C of the set of pixels 62 is reported as the determined cooling hole location. In another instance, a location on the perimeter, 62P of the set of pixels 62 is reported as the identified cooling hole location. While the centroid 62C may sufficiently indicate the cooling hole location, a point at the perimeter of the set of pixels 62 may be more representative of the center of the cooling hole 56, due to the possibility that the flow of the fluid F may immediately move away from the cooling holes 56 upon exiting the cooling holes 56.

At any rate, at 74, the cooling hole location is initially expressed, at 74, relative to secondary datums 76 located on the root section 28 of the component 12. For instance, during the through-hole inspection discussed above, the component 12 may be supported by its root section, by way a fixture 78. The locations where the fixture 78 interfaces with the root 28 are referred to as secondary datums 76. In examples where this disclosure is used relative to a stator vane, the secondary datums 76 would be adjacent an inner and/or outer platform.

These locations are then translated, at 80, to be expressed in terms of primary datums. As is known in this art, primary datums are points where a component is typically supported during machining Engineering specifications, which include the acceptable cooling hole locations, are typically provided with reference to these primary datums. Example primary datums 82A-82D are illustrated at the leading edge 40 of the airfoil section 32 adjacent the platform (82A), at the leading edge of the airfoil section adjacent the blade tip 34 (82B), at the upper surface of the platform 30 (82C), and at the trailing edge 42 (82D).

At 53, the location of the cooling holes is compared with the engineering specifications to identify misaligned holes, such as the misaligned hole 56M, which is identified as a misaligned hole, at 70 in FIG. 4, because the centroid 70C is located outside the acceptable hole location 58. Alternatively, if a perimeter is used to report the cooling hole locations, a misaligned hole may still be identified because at least some perimeter pixels 70P lie outside the acceptable hole location 58.

As known in the art, depending on the defects identified at 53, corrective measures, such as further manufacturing, can be undertaken to correct the defective cooling holes (such as the 56P, 56M, and 56B).

It is possible to mount the component 12 relative to the primary datums 84A-84D during the initial inspection, however, this mounting may interfere with the flow of fluid F exiting the cooling holes 56, which may negatively impact the results of the through-hole inspection. Alternatively, it may be possible to probe the component 12 relative to the primary datums 84A-84D, such that the through-hole inspection would be reported relative to the primary datums in the first instance. However, probing adds time to the inspection process.

Accordingly, this disclosure provides a method and assembly for inspecting a component without multiple inspection steps, and therefore increases the overall efficiency of the inspection process.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An inspection assembly, comprising:
a controller configured identify a set of pixels adjacent an acceptable hole location along an airfoil section of an engine component, wherein the controller is configured to identify a centroid of the set of pixels, wherein the controller is configured to identify a misaligned hole based on the centroid being outside the acceptable hole location, wherein the acceptable hole location is a predefined, acceptable location of a single cooling hole, wherein the pixels within the set of pixels are a color corresponding to a known temperature of a fluid used in a through-hole inspection, and wherein at least some pixels within the set of pixels are inside the acceptable hole location.

2. The assembly as recited in claim 1, further comprising:
a thermal imaging camera configured to capture the set of pixels;
a fixture for supporting the engine component; and
a fluid source in communication with a core passageway of the engine component.

3. The assembly as recited in claim 2, wherein the core passageway is in fluid communication with a plurality of cooling holes on an outer surface of the airfoil section.

4. The assembly as recited in claim 2, further comprising a conduit connecting the fluid source to the core passageway.

5. The assembly as recited in claim 1, wherein the controller is configured to identify partially blocked holes by determining a number of pixels within the set of pixels that are inside the acceptable hole location and determining that the number is greater than zero but below a minimum threshold.

6. The assembly as recited in claim 1, wherein the controller is in communication with a model including the acceptable hole locations.

7. The assembly as recited in claim 1, wherein the controller is configured to identify the misaligned hole based on the centroid being outside the acceptable hole location even when a pixel count of the set of pixels is greater than or equal to a minimum threshold, wherein the minimum threshold is a predetermined value known to corresponding to a cooling hole that provides adequate cooling.

8. A method, comprising:
performing a through-hole inspection on a component of a gas turbine engine, wherein the results of the through-hole inspection include a plurality pixels;
identifying a set of pixels adjacent an acceptable hole location along an airfoil section of the component;
determining a centroid of the set of pixels; and
identifying a misaligned hole based on the centroid being outside the acceptable hole location,
wherein the pixels within the set of pixels are a color corresponding to a temperature of a fluid used in the through-hole inspection,
wherein at least some pixels within the set of pixels are inside the acceptable hole location,
wherein the acceptable hole location is a predefined, acceptable location of a single cooling hole.

9. The method as recited in claim 8, further comprising identifying a partially blocked hole by determining a number of pixels within the set of pixels that are inside the acceptable hole location and determining that the number is greater than zero but below a minimum threshold.

10. The method as recited in claim 8, wherein the through-hole inspection includes a flow thermography process.

11. The method as recited in claim 10, wherein the flow thermography process includes providing a flow of the fluid within the component and taking a thermal image as the fluid exits the holes formed in the airfoil section of the component.

12. The method as recited in claim 11, wherein taking the thermal image includes taking a thermal video of the fluid exiting the holes.

13. The method as recited in claim 8, further comprising expressing the locations of holes in the airfoil section of the component relative to secondary datums.

14. The method as recited in claim 13, further comprising translating the locations of holes to being expressed in terms of primary datums.

15. The method as recited in claim 14, wherein the component is an airfoil including the airfoil section and a root, the secondary datums are located on the root, and the primary datums are located on the airfoil section.

16. The method as recited in claim 8, further comprising:
   forming a plurality of cooling holes in the airfoil section before the through-hole inspection is performed; and
   if a misaligned hole is identified, further manufacturing the airfoil section to correct the misaligned hole.

17. The method as recited in claim 8, wherein the through-hole inspection generates a plurality of sets of pixels, each of the sets of pixels is adjacent a respective acceptable hole location along the airfoil section, locations of each of the sets of pixels are determined by identifying a centroid of the respective set of pixels, and misaligned holes are identified based on one of the centroids being outside a respective one of the acceptable hole locations.

\* \* \* \* \*